(12) United States Patent
Barkan

(10) Patent No.: US 10,051,133 B2
(45) Date of Patent: *Aug. 14, 2018

(54) SYSTEMS, DEVICES AND METHODS FOR PROVIDING ACCESS TO A DISTRIBUTED NETWORK

(71) Applicant: Barkan Wireless IP Holdings, L.P., Wilmington, DE (US)

(72) Inventor: Elad Pinhas Barkan, Kfar Sirkin (IL)

(73) Assignee: Barkan Wireless IP Holdings, L.P., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/199,565

(22) Filed: Jun. 30, 2016

(65) Prior Publication Data

US 2016/0316067 A1    Oct. 27, 2016

Related U.S. Application Data

(63) Continuation of application No. 13/590,253, filed on Aug. 21, 2012, now Pat. No. 9,392,638, which is a
(Continued)

(51) Int. Cl.
*H04M 7/00* (2006.01)
*H04W 4/24* (2018.01)
(Continued)

(52) U.S. Cl.
CPC ........ *H04M 7/0066* (2013.01); *H04B 17/318* (2015.01); *H04L 12/2856* (2013.01);
(Continued)

(58) Field of Classification Search
None
See application file for complete search history.

(56) References Cited

U.S. PATENT DOCUMENTS 5,138,650 A   8/1992   Stahl et al.
5,202,912 A   4/1993   Breeden et al.
(Continued)

FOREIGN PATENT DOCUMENTS

EP   0643543 A2   3/1995
EP   0426269 B1   8/1995
(Continued)

OTHER PUBLICATIONS

Applicant Initiated Interview Summary issued by United States Patent Office in Continuation U.S. Appl. No. 13/590,253 dated Nov. 21, 2012, 3 pages.
(Continued)

*Primary Examiner* — Huy D Vu
*Assistant Examiner* — James P Duffy
(74) *Attorney, Agent, or Firm* — Spencer C. Patterson; Grable Martin Fulton PLLC

(57) ABSTRACT

Systems and apparatus, and methods relating thereto, can be implemented to include base station having a transceiver adapted to establish a radio-frequency link with a mobile telephone; a first interface, separate from said transceiver, that is adapted for communication over the public Internet; and a controller. The controller can be adapted to obtain from a server accessed via the public Internet, gateway address information for a remote gateway that provides an interface between the public Internet and a network of a telephone service provider and route data from the mobile telephone, over the public Internet, to the remote gateway.

25 Claims, 7 Drawing Sheets

Related U.S. Application Data continuation of application No. 13/181,543, filed on Jul. 13, 2011, now Pat. No. 8,559,312, which is a continuation of application No. 09/871,661, filed on Jun. 4, 2001, now Pat. No. 8,014,284, which is a continuation of application No. PCT/IL99/00438, filed on Aug. 12, 1999.

(51) Int. Cl.

| | |
|---|---|
| H04W 88/08 | (2009.01) |
| H04B 17/318 | (2015.01) |
| H04L 12/28 | (2006.01) |
| H04W 48/16 | (2009.01) |
| H04W 64/00 | (2009.01) |
| H04W 88/16 | (2009.01) |
| H04W 16/16 | (2009.01) |
| H04W 84/04 | (2009.01) |

(52) U.S. Cl.
CPC ............ *H04W 4/24* (2013.01); *H04W 48/16* (2013.01); *H04W 64/003* (2013.01); *H04W 88/08* (2013.01); *H04W 88/16* (2013.01); H04M 2215/2026 (2013.01); H04M 2215/2033 (2013.01); H04M 2215/22 (2013.01); H04M 2215/32 (2013.01); H04W 16/16 (2013.01); H04W 84/045 (2013.01)

(56) References Cited

U.S. PATENT DOCUMENTS

| | | | |
|---|---|---|---|
| 5,276,686 A | 1/1994 | Ito | |
| 5,398,285 A | 3/1995 | Borgelt et al. | |
| 5,517,549 A | 5/1996 | Lee | |
| 5,539,824 A | 7/1996 | Bjorklund et al. | |
| 5,548,583 A | 8/1996 | Bustamante | |
| 5,592,172 A | 1/1997 | Bailey et al. | |
| 5,594,782 A * | 1/1997 | Zicker | H04M 1/27 455/417 |
| 5,675,629 A | 10/1997 | Raffel et al. | |
| 5,729,536 A | 3/1998 | Doshi et al. | |
| 5,737,703 A | 4/1998 | Byrne | |
| 5,745,556 A | 4/1998 | Ronen | |
| 5,745,884 A | 4/1998 | Carnegie et al. | |
| 5,751,813 A | 5/1998 | Dorenbos | |
| 5,787,360 A | 7/1998 | Johnston et al. | |
| 5,793,762 A | 8/1998 | Penners et al. | |
| 5,818,820 A | 10/1998 | Anderson et al. | |
| 5,845,267 A | 12/1998 | Ronen | |
| 5,862,223 A | 1/1999 | Walker et al. | |
| 5,884,179 A | 3/1999 | Patel | |
| 5,884,270 A | 3/1999 | Walker et al. | |
| 5,898,931 A | 4/1999 | Johnston | |
| 5,930,728 A | 7/1999 | Evanyk | |
| 5,933,420 A * | 8/1999 | Jaszewski | H04W 16/14 370/329 |
| 5,966,659 A | 10/1999 | McDonald et al. | |
| 5,973,639 A * | 10/1999 | Biacs | G01S 19/09 342/357.31 |
| 5,995,839 A | 11/1999 | Coursey et al. | |
| 6,028,849 A | 2/2000 | Niot et al. | |
| 6,041,228 A | 3/2000 | Kvarnstrom et al. | |
| 6,070,078 A * | 5/2000 | Camp, Jr. | G01S 5/0027 342/357.59 |
| 6,097,733 A | 8/2000 | Basu et al. | |
| 6,122,263 A | 9/2000 | Dahlin et al. | |
| 6,222,829 B1 | 4/2001 | Karlsson et al. | |
| 6,240,083 B1 * | 5/2001 | Wright | H04W 74/02 370/348 |
| 6,272,129 B1 | 8/2001 | Dynarski et al. | |
| 6,359,880 B1 | 3/2002 | Curry et al. | |
| 6,377,810 B1 | 4/2002 | Geiger et al. | |
| 6,400,719 B1 * | 6/2002 | Chimura | H04L 29/12066 370/395.31 |
| 6,424,717 B1 * | 7/2002 | Pinder | H04L 63/04 348/E5.004 |
| 6,438,379 B1 * | 8/2002 | Gitlin | H04W 16/06 455/449 |
| 6,497,599 B1 | 12/2002 | Johnson et al. | |
| 6,501,732 B1 | 12/2002 | Xu et al. | |
| 6,545,988 B1 | 4/2003 | Skog | |
| 6,571,221 B1 | 5/2003 | Stewart et al. | |
| 6,578,082 B1 | 6/2003 | Ho | |
| 6,578,085 B1 * | 6/2003 | Khalil | H04L 45/00 709/241 |
| 6,594,252 B1 | 7/2003 | Barany et al. | |
| 6,651,105 B1 | 11/2003 | Bhagwat et al. | |
| 6,683,860 B1 | 1/2004 | Forssell et al. | |
| 6,683,871 B1 | 1/2004 | Lee et al. | |
| 6,687,226 B1 | 2/2004 | Galyas | |
| 6,721,278 B1 | 4/2004 | Rimhagen et al. | |
| 6,724,731 B1 * | 4/2004 | Shibasaki | H04W 76/062 370/242 |
| 6,729,929 B1 | 5/2004 | Sayers et al. | |
| 6,731,945 B2 | 5/2004 | Do | |
| 6,807,168 B2 | 10/2004 | Daly et al. | |
| 6,847,632 B1 | 1/2005 | Lee et al. | |
| 6,850,764 B1 | 2/2005 | Patel | |
| 6,853,851 B1 | 2/2005 | Rautiola et al. | |
| 6,888,803 B1 | 5/2005 | Gentry et al. | |
| 6,937,566 B1 | 8/2005 | Forslow | |
| 6,944,146 B1 | 9/2005 | Barany et al. | |
| 6,982,959 B1 | 1/2006 | Salonaho et al. | |
| 7,529,271 B2 | 5/2009 | Forssell | |
| 9,392,638 B2 * | 7/2016 | Barkan | H04W 4/24 |
| 2001/0030951 A1 | 10/2001 | Kokot et al. | |
| 2002/0188720 A1 | 12/2002 | Terrell et al. | |
| 2008/0028436 A1 | 1/2008 | Hannel et al. | |
| 2012/0224479 A1 | 9/2012 | Forssell et al. | |

FOREIGN PATENT DOCUMENTS

| | | |
|---|---|---|
| EP | 0825751 A2 | 2/1998 |
| EP | 0863684 A2 | 9/1998 |
| EP | 0578041 B1 | 11/1999 |
| EP | 0793170 B1 | 12/2002 |
| EP | 0766427 B1 | 10/2006 |
| GB | 2327830 A | 3/1999 |
| WO | 9524106 A1 | 9/1995 |
| WO | 9811703 A2 | 3/1998 |
| WO | 9909685 A2 | 2/1999 |
| WO | 9935800 A2 | 7/1999 |
| WO | WO 99/35800 * | 7/1999 ............ H04L 29/06 |

OTHER PUBLICATIONS

EPO Communication filed Response in European Patent Application 99936950.7 dated Dec. 21, 2010, 26 pages.
EPO Communication filed Response in European Patent Application 99936950.7 dated Jul. 18, 2011, 14 pages.
EPO Communication filed Response in European Patent Application 99936950.7 dated Jun. 20, 2008, 6 pages.
EPO Communication filed Response in European Patent Application 99936950.7 dated Mar. 12, 2012, 14 pages.
EPO Communication filed Response in European Patent Application 99936950.7 dated Nov. 20, 2012, 12 pages.
EPO Communication for corresponding European Patent Application No. 99936950.7 dated Dec. 28, 2007, 10 pages.
EPO Communication for corresponding European Patent Application No. 99936950.7, dated Feb. 6, 2013, 5 pages.
EPO Communication for corresponding European Patent Application No. 99936950.7, dated Feb. 8, 2010, 6 pages.
EPO Communication for corresponding European Patent Application No. 99936950.7, dated Jan. 18, 2011, 9 pages.
EPO Communication for corresponding European Patent Application No. 99936950.7, dated Jul. 10, 2012, 64 pages.
EPO Communication for corresponding European Patent Application No. 99936950.7, dated Sep. 5, 2011, 7 pages.
Examination Report of corresponding European Patent Application No. 99936950.7, dated Feb. 29, 2012.

(56) References Cited

OTHER PUBLICATIONS

Examination Report of corresponding European Patent Application No. 99936950.7, submitted Mar. 10, 2011.
Filed Response submitted Feb. 21, 2013 to Non-Final Office Action received in U.S. Appl. No. 13/590,253, dated Nov. 21, 2012, 18 pages.
International Search Report received in corresponding European Patent Application No. 99936950.7 dated Feb. 3, 2000, 4 pages.
Mouley, M., et al., "Communication Management," GSM System for Mobile Communications, Lassay-Les-Chateaux, Europe Media, FR 1993, pp. 500-566, XP000860008.
Non-Final Office Action received in the U.S. Appl. No. 13/181,543, dated Mar. 29, 2013, 10 pages.
Non-Final Office Action received in the United State Patent Office in Continuation U.S. Appl. No. 13/590,253, dated May 8, 2013, 23 pages.
Non-Final Office Action received in the United State Patent Office in Continuation U.S. Appl. No. 13/590,253, dated Nov. 21, 2012, 27 pages.
Supplementary European Patent Search Report for corresponding European Patent Application No. 99936950.7, dated Jul. 18, 2006, 5 pages.

\* cited by examiner

SYSTEMS, DEVICES AND METHODS FOR PROVIDING ACCESS TO A DISTRIBUTED NETWORK

RELATED APPLICATIONS

This application is a continuation of and claims priority from U.S. application Ser. No. 13/590,253 filed Aug. 21, 2012, which is a continuation of and claims priority from U.S. application Ser. No. 13/181,543 filed on Jul. 13, 2011, now U.S. Pat. No. 8,559,312, which is a continuation of and claims priority from U.S. application Ser. No. 09/871,661 filed Jun. 4, 2001, now U.S. Pat. No. 8,014,284, which is a continuation of and claims priority from PCT/IL1999/000438 filed on Aug. 12, 1999, all of which are hereby incorporated by reference into the present application in their entirety.

FIELD OF THE INVENTION

The invention concerns systems for creating cellular distributed networks and methods for controlling their installation and operation. The invention concerns in particular add-on base stations that allow the creation or expansion of such networks.

BACKGROUND OF THE INVENTION

Currently, it is relatively expensive, time consuming and difficult to install cellular networks. The network installation is especially problematic in highly populated urban areas.

Cellular systems use base stations to establish an RF link between each user in the cell and the cellular wired network. These base stations use a relatively high transmit power, to overcome propagation losses in order to achieve a reliable link. This high RF power, however, may be harmful to people nearby. Moreover, it may interfere with other electronic equipment. These may be part of the reasons why people object to the installation of base stations in populated areas.

In highly populated areas there is a need for more base stations, more closely located to each other. As more users are to be served in a specific area, the cells are made smaller, and more base stations have to be installed.

Therefore, the objection of the public to the installation of additional base stations is a serious impediment to the development of a cellular network.

Moreover, in highly populated areas the real estate is usually expensive.

It requires a large investment to install base stations in these areas and to install the wiring as required.

Once the base stations are installed, it may be required to service them.

One can appreciate the high maintenance cost for a multitude of base stations located in a highly populated urban area.

Heretofore, a large distributed network required a plurality of large switchboards to make all the required connections. As the number of cells and users increase, the number and complexity of switchboards increases as well.

There is a large number of concurrent calls that have to be supported. This further increases the cost of setting up and operating a cellular network.

It is an objective of the present invention to facilitate the installation and expansion of distributed cellular networks, especially in highly populated urban areas.

Another problem in cellular systems is the relatively high transmitted power of the mobile phones. The transmit antenna is close to the user's head, and the RF radiation may have undesirable effects.

As the distance to a base station increases, the mobile transmitter has to transmit at a higher power. Thus, from the radiation hazard viewpoint, it would be desirable to have more base stations, more closely related. This would allow transmission at lower power. There are problems to adding base stations, however, as detailed above.

It is another objective of the present invention to achieve a reduction in the mobile phone transmit power, by using more base stations that are more closely located to each other.

DISCLOSURE OF INVENTION

It is an object of the present invention to provide a system and method that facilitate the installation of distributed cellular networks, especially in developed and highly populated urban areas, using a structure and method implemented with an add-on base station. This may also allow the public at large to participate in providing telecommunication services.

Basically, the system uses the existing infrastructure, for example cable TV, Internet connections and phone networks to provide additional wireless coverage.

According to the invention, the public can participate in providing the function of add-on base stations. These public-owned and public-operated base stations complement a cellular network, thus increasing the density of base stations to provide better coverage with smaller cells.

A novel network structure allows the inclusion of these public-operated base stations within a distributed cellular network.

Call coordination means are used to control the operation of the network.

A distributed network may incorporate the novel base stations within a conglomerate of cellular nets, wired telephone networks and an Internet.

A novel feature of the base station is an unique property of each device. This allows its use as an add-on base station. In prior art, each phone had an unique identity, however the base stations had no unique properties. Each base station in prior art was distinguished based on its fixed location and wiring; there were no distinguishing means in the base station itself. In the novel approach according to the present invention, however, there are base stations that are add-on units to be added to a network by various persons or firms.

The location of each such unit is not known a priori; its very existence has to be announced to the network. A base station with an unique identity allows the network to keep track of the addition of each new base station.

Each novel base station includes means for providing an incentive to the public to acquire and operate them, so as to enhance the cellular network. Using an economic incentive (for example, payment to the owner of a base station for use of his/her device) will stimulate people to operate these base stations. Thus, parts of the public will no more object to the installation of base stations. Rather, people will participate in the development of the cellular network.

According to another aspect of the invention, a payment system is disclosed, that uses digital tokens or prepaid digital documents. Tokens may be downloaded from a center, and the whole process may be made transparent to the user.

Using a multitude of base stations, each for a small area, allows to reduce the transmit power of each station. Thus, people will no longer have to worry about the harmful effects of RF radiation.

It may be easier to obtain licenses to operate base station that use a lower transmit power.

Moreover, it is possible to achieve a reduction in the mobile phone transmit power, by using more base stations that are more closely located to each other.

Furthermore, in accordance with the invention, the object is basically accomplished by using the existing telecommunication infrastructure that is available in developed areas.

In these areas, there are available a large number of telephone lines as well as Internet links. These telecommunication facilities are not used all the time. Provided the right incentive, people will offer these facilities for other people's use in cellular links.

Heretofore, a large distributed network required a plurality of large switchboards to make all the required connections.

A novel approach uses a cellular coordination center that does not perform the actual call switching.

Rather, the new center just provides the information required for making a call. Thus the workload on the center is greatly reduced. Smaller, simpler and lower cost switchboards may be used.

In some cases, the switchboards may be eliminated altogether.

A first user is given an Internet address of the other party and may connect it directly. This achieves a direct link from one base station to another, through IP. It may also be possible to connect users through the same base station.

Prior art teaches how to connect two computers that are located at fixed locations. The present invention discloses a structure and method for connecting mobile units, using a center for coordinating the connection.

The technology in the present disclosure may be used for the transmission of voice, data, multimedia or a combination thereof.

Further objects, advantages and other features of the present invention will become obvious to those skilled in the art upon reading the disclosure set forth hereinafter.

DESCRIPTION OF DRAWINGS

The invention will now be described by way of example and with reference to the accompanying drawings in which.

MODES FOR CARRYING OUT THE INVENTION

A preferred embodiment of the present invention will now be described by way of example and with reference to the accompanying drawings. Some of the features in the example refer to voice transfer.

It is to be understood, however, that the technology in the present disclosure may be used for the transmission of voice, data, multimedia or a combination thereof.

Figure 1:
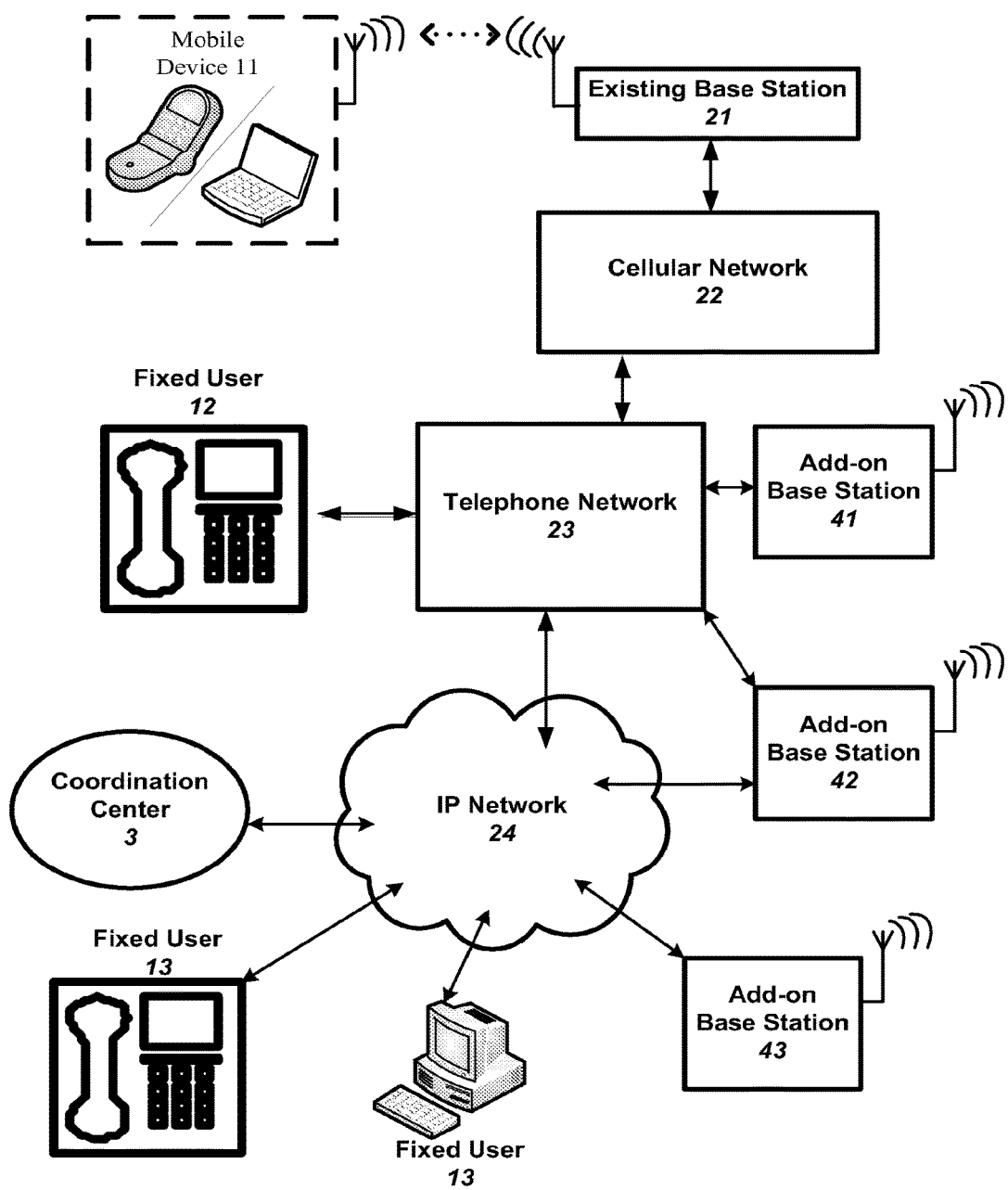
FIG. 1 illustrates a distributed cellular network.

FIG. 1 illustrates a distributed cellular network providing, in this example, communications between a mobile user 11, a fixed user 12 and a fixed user 13.

A communication network may include, for example, a cellular network 22, a telephone network 23 and an Internet network 24, all linked to each other.

Throughout the present disclosure, Internet refers to any IP network, that may be for example the Internet or an Intranet.

User 11 is connected through a regular base station 21 to the cellular network 22. Users 12 and 13 are each connected to the telephone network 23 and an Internet network 24, respectively. Since all these networks are connected to each other, communication links may be provided between the above users. The link to user 11 is wireless, whereas the link to user 12 is wired. The link to user 13 may be implemented with various means.

An existing network may include, for example, an IP network, such as the Internet, or Internet over cables, or a wired telephone network. Voice communication may be conducted in a voice over IP method using a known technology. Basically, the voice is digitized, sometimes compressed, and cut into packets of data.

The packets are sent over an IP network to their destination.

It is possible that some packets are lost during the routing, and that the packets are received in a different order. However, if not too many packets are lost, the voice quality remains OK. A buffer is usually enough to compensate for the re-ordering of packets.

The above description refers to communications systems as known in the art.

The novel approach allows to expand the above network, for example with the addition of new base stations 41, 42 and 43.

The add-on base stations 41, 42 and 43 illustrate three types of additions to a cellular network. These are three ways the public can participate in the network to enhance its capabilities.

Add-on base station 41 allows to connect a mobile user (not shown) to the existing telephone network 23. The device includes a wireless link with an antenna to connect to a mobile user, and a wired link to connect to an existing communication network.

This base station may be owned and operated by an independent person or organization. Once this device, the base station 41, is bought and operated by its owner, it generates a wireless cell in its surroundings. The device will connect a mobile user in that cell to the telephone network 23, and to any other network and/or user that may be connected to network 23, either directly or indirectly.

Any person or firm or other entity that has a telephone line (a connection to network 23) can buy an add-on base station 41 and connect it to the phone line, to create a new cell in the communication network. Thus, the public, on their own initiative, may add wireless cells to the network.

Thus, our box achieves the function of a cellular base station in a distributed cellular network. It is also a micro-center for routing calls, as detailed below.

The owner of the box connects it to an IP network to expand the existing cellular infrastructure—now a user can connect through the new base station to an Internet, to establish a link with a remote user.

It is assumed that all new base stations are connected to an Internet, since it is in widespread use. A user may connect to an Internet in various ways, for example using a telephone line, a cable TV channel, wireless links etc.

Possible Internet links include the package delivery link and the TCP. Voice links usually use the former link, since in the latter there may be a delay.

In a highly populated area, where there are many phone lines and a numerous population, there is a great probability that many people will buy the novel base stations to generate many new wireless cells.

Thus, new base station 41 adds a new wireless cell in a location where there is available a link to the telephone network 23 (a phone line).

Base station 42 illustrates another type of network enhancement. It connects between an Internet 24 and the telephone net 23. This allows a remote caller (not shown) to place a call to a phone in the neighborhood of base station 42: That remote caller connects base station 42 over the Internet 24, and requires a connection to a phone close to that base station.

This achieves a lower cost communication link, since it comprises an Internet link that is low cost, and a local phone call from base station 42. It avoids the high cost of long distance phone calls. This type of base station is useful in the implementation of the present invention.

New base station 43 illustrates yet another type of network enhancement. It generates a wireless cell that is directly connected to an Internet 24.

Thus, new base station 43 adds a new wireless cell in a location where there is available a link to an Internet network 24.

The system uses the existing infrastructure, for example cable TV, Internet connections and phone networks to provide additional wireless coverage. The above detailed structure and method may be used for other networks as well. These may include, among others, wireless links, satellite links, cable TV links, fiber-optics or a combination thereof.

Thus, new base stations 41, 42 and 43 allow to use the existing telecommunication infrastructure in developed areas, to enhance the cellular network.

Private individuals or firms or other entities that have access to existing communication channels and do not use those channels all the time, may contribute to a cellular network by providing access to those channels. The novel system includes means to offer an incentive to people, to motivate them to install and operate the base stations. These include means for collecting a payment for services rendered with the base station.

Thus, it is possible to install or expand a cellular network without the need for a large investment in infrastructure. Rather, the new network is based on the existing infrastructure, for example a telephone network, a wireless network, Internet or a combination thereof.

Usually, existing networks have spare capacity. A user does not speak all the time. Therefore, existing networks offer a great potential for expansion, by supporting new cellular networks.

Prior art cellular systems are easier to install in sparsely populated areas, where there is no problem of interference, base stations installation etc. These systems are much more difficult to install in towns or other highly populated areas, where there are the problems cited above. The present invention solves the problem of cellular installation and achieves best performance in the densely populated areas that were difficult to address in the past.

The very population that may have opposed to the cellular net, are now helping the setting up of the new cellular network.

According to the new concept, small cells are thus created in cities or other populated areas.

The maintenance cost is greatly reduced. The system operator is no longer responsible for the maintenance of a multitude of base stations located in a highly populated urban area. Rather, each owner of a private base station is interested to keep his/her equipment in working order. If there is a problem, the owner will see to repairs or a replacement.

In a preferred embodiment, simple and low cost base stations are used, that are expendable—when a malfunction is detected in a base station, the unit is discarded and replaced with a new one.

The novel approach or method allows for a rapid deployment of a cellular network. There is no time-consuming work to be done, to create a new infrastructure from zero.

The new system does not need a plurality of large switchboards to make all the required connections. In prior art systems, as the number of cells increases, the number and complexity of switchboards increases as well. There is a large number of concurrent calls that have to be supported. This adds to the cost of setting up and operating a cellular network.

The new system, however, uses the switchboards in the existing infrastructure for call switching. Therefore, there is no need to add costly switchboards.

There is a need for a coordination center that issues information relating to completing a call as required. Alternately, a plurality of centers may be used. These centers only provide information prior to a call, and do not take part in the actual link being formed. Thus, simpler and lower cost centers are required.

This novel feature may achieve a large reduction in the investment required to install or expand a cellular network.

The centers store information for each base station, including the telephone number used by that station. This information may be advantageously used to generate new links, to help one user to locate an IP base close to the desired destination.

The novel centers are also responsible for price setting, as determined by an operator there. The information regarding prices of use of the net and the additional, private base stations, is disseminated as digital documents encrypted so as to prevent tampering with.

The centers are also responsible for tracking down malfunctions in the cellular network. If a base station would not respond or would not operate correctly, that information is brought to the attention of the center by related parties. The center will disseminate that information, to help user form communication links with reliable channels and base stations only.

The new centers may initiate calls to the various base stations, to verify their correct operation.

Thus, the new cellular centers correlate and guide the operation of the users in the net, in real time.

Usually, a link will be formed with one switchboard at the source (the person who initiated the call) and a switchboard at the destination. Additional switchboards are usually needed in between the above switchboards. These are existing switchboards, that are part of the existing infrastructure.

The cellular links thus formed may be used for various purposes, for example to transmit voice or data.

A problem in a large network is the coordination of all the additions to the cellular network. One can appreciate that a multitude of cells, provided by many people, may be difficult to use and would require complex systems to route all the calls taking place concurrently. Usually, this would require a plurality of large switchboards to make all the required connections.

A novel approach uses a cellular coordination center 3 that does not perform the actual call switching. Rather, the new center 3 just provides the information required for making a call. Center 3 (or a network of such centers) stores information regarding the various base stations, their location and coverage, availability and connections. When a user places a call, he demands information from center 3. Center 3 provides the required information for placing a call, including a base station close to the desired destination and more, as detailed below.

After providing the information to the caller, center 3 does not participate in the actual call routing; rather, this is performed by the caller, using the existing network infrastructure.

Thus the workload on the center 3 is greatly reduced. Smaller, simpler and lower cost switchboards or cellular coordination centers may be used.

In some cases, the switchboards may be eliminated altogether.

A first user is given an Internet address of the other party and may connect it directly. This achieves a direct link from one base station to another, through IP. It may also be possible to connect users through the same base station.

The phones of the network are basically similar to existing cellular handsets, except minor changes as detailed below.

Regarding the base stations: In prior art cellular networks, the switchboards are always necessary in order to connect between cellular phones.

In the new system, communications may take place between cellular phones without the intervention of switchboards. This may result in faster, more effective communications.

Add-on base stations can be installed and owned by the cellular network operator, but in a preferred embodiment, the base stations are sold with the cellular phone, or without it, to anyone—private persons or firms for example.

People will have an incentive to connect the base station in their home/office, since they will get royalties from the cellular network operator.

Preferably, the size and shape of an add-on base station is similar to that of a cordless telephone base. This may achieve an easy to use device, whose operation is familiar to the user.

Structure and Operation of the Cellular Center 3

Unlike presently used cellular centers, the center 3 of the novel network does not need to carry the role of a switchboard. Existing switchboards in a cellular or phone system may be used as usual, as well as regular IP routing. The new center 3 coordinates the operation of the new base stations like 41 and 43 as illustrated.

The duties of the cellular centers 3 include, among others:
a) Network integration and planning, b) Implementing a price policy, c) Network operability, d) Manager of phone locator. (In case of incoming calls).

DETAILED DESCRIPTION a) The Cellular center 3 knows the current physical location of all add-on base stations, and is aware of the status of each base station (i.e. is available or not available, optionally processing a call etc.).

There may be a trade-off between the desire to keep the center updated, and the need not to overload it. If too high a frequency of reporting to the center is used, this may achieve a center that is updated to the last minute changes, however a large expensive center may be required.

Alternately, it is possible to limit the rate of updates and the type of events that require a report to center. The center does not have to know of any minute change in a base station.

For example, if a base station is busy, but the center is not aware of it, the user may use an alternative base station.

b) The cellular center is responsible for the price policy.

It determines and publishes the cost for each operation over the network. The updated information may be transferred over an Internet, or may be available to add-on base stations.

The information may be dispersed between units in the network. In each transaction, the parties thereto will check the date of each price list. The more updated price list will be transferred to the other party. Thus, the new price list or policy will gradually expand throughout the network.

c) The cellular center is responsible to actively check, once in a while, the availability of base stations and their operability (see if they work properly).

d) One of the main tasks of the cellular center is to give the function: when given a "cellular phone number", it is able to return the IP address of a base station, that has radio contact with it. Alternately, it may return a message that the phone is in the "out of coverage area".

A call processing method is detailed below with reference to FIGS. 5, 6 and 7.

Data Security

Each phone, base station and the cellular center 3 may have their own digital certificate, which binds a cryptographic public key, with an identifier.

The certificate may also contain information such as their phone number or identity. The extra information can also be included in other digitally signed digital documents.

In this way the packets of voice originating from the phone, can be encrypted by the destination public key to the other phone, ensuring privacy. They can also (or alternatively) signed by the originator's private key, to ensure authentication (and possibly non-repudiation).

A phone user may require that all incoming or outgoing calls be authenticated and/or encrypted.

The control channel includes the information exchanged between base stations, phones and/or centers.

The control channel can be encrypted at the base stations, the centers and/or the phones.

The phone can send back to the base station the necessary changes (such as a cell change). The communication between the phone and its base station can also be encrypted.

It is possible to preserve the anonymity of the caller and the addressee, using the following method:

A. A caller sends a request to connect to a specific addressee, using a message encrypted with the public key of a center 3. The message also includes the identification of the caller.

Nobody can read this message, since it is encrypted.

B. The center decrypts the message, identifies the caller and the addressee.

C. The center composes a message for the addressee and encrypts it with the public key of the addressee. The message is then sent to base stations that may be in contact with that addressee.

The actual policy in use may vary from network to network. A search path may be followed, according to information from past activity for example.

D. The base station transmits the message "as is" or in a modified form.

In any case, the encrypted section is preserved—the base station and other phones in the area will not know who is the caller and who is the addressee.

E. Only the designated addressee will be capable to decrypt the message, and will be thus notified of the attempted connection. Other phones, that do not possess the required private key, will not be able to decrypt the message, and will thus know that the message was not addressed to them.

F. If the addressee decides to answer the call, he sends a response message, encrypted with a known public key—for example that of the center, or may ask the base station to reply to that call.

G. The center sends a message to the caller, with information to allow him to implement the connection with the addressee.

In another embodiment of the invention, the addressee may contact directly the caller.

The above method preserves the anonymity of the caller and the addressee. Although the communication may pass through various switchboards and base stations, none will know the identity of the parties to the conversation, except the cellular center. The center may know about the inquiry, but it will not know whether a communication actually did take place between the parties involved.

The subsequent dialog or data transfer may be en clair; it is believed that the identity of the parties to a communication may be more important than the actual information being transferred. Thus, for an eavesdropper the dialog itself may be meaningless if the identity of the parties involved is kept secret.

Thus, all the cellular phones are open and continuously receive the various messages transmitted from a base station in step (D) above. The messages decryption takes computer power, so that it may waste the battery power.

To save on battery, the phones may be divided into a predefined number of groups, for example 1,000 groups. The message to a phone may include a short header that indicates the addressee group. This is a short number that is easy to decrypt; a telephone will decrypt the whole message only if the header of the message corresponds to the group of that phone.

To improve security, the cellular center 3 may accept a request to locate phones (locate nearest IP) only from base stations. The base stations that help to locate a phone, (or the phone itself) may do so only if requested by the cellular center, or by some other authorized entity.

Thus, in step (B) the center checks the authorization of the caller to send the request; only if the caller is authorized, then the center will proceed to execute step (B); otherwise go to step (H). The authorization may be checked using authorization tables kept at the center for that purpose.

The above means help achieve privacy in a distributed network—it prevents a user's location from being divulged to others.

The cellular center 3 can issue a certificate (an operating license) or another digital document, to the effect that "this phone/base station is part of my network and is in working order" to all the devices connected thereto. The certificates may have a short expiration date, of 1 day for example. This gives the center 3 control over the phones and base stations, that may be disconnected at short notice.

This allows a phone to ask the services of a base station only if it has an updated operating license. Similarly, a base station can verify that the phone is operating properly.

This is one way that a cellular center can exclude "badly behaving" devices from the network. Devices may be otherwise disconnected or excluded for other reasons, as programmed into the center's operating program.

Billing

An important aspect of the present invention is the means for paying to the owner of the add-on base station for his/her services. This provides the incentive for acquiring and operating these base stations.

Since the sessions are encrypted, the payment process can be performed in a way similar to that used with smart cards in prior art. An encrypted session is akin to a point to point, secure link.

Thus, the base station includes means for accepting a payment and for displaying to the user information relating to the payments received.

Using encryption and digital documents, it is possible to reliably implement the payment method as detailed in the present disclosure, while preventing impostors or others who may present false payment means. This may help prevent stealing of calls, that is a problem in present systems.

Further means to prevent calls stealing is the caller ID and destination ID. That is, in the novel system both the identity of the caller and the destination may be known. This may prevent or intimidate a potential thief, who may know that his actions will be recorded and detected.

A possible method of billing is by way of money or tokens.

Digital documents may be used that correspond to cash money or to a credit or right to use the network at someone's expense, or may represent phone tokens having a specific monetary value each.

These documents may be encrypted or signed so as to allow the owner of the base station to receive payment for services rendered.

The phone may download tokens or money from the center or from a plastic card or a smart card or by other means. These payment means may be stored in the phone for subsequent use.

When originating a call, or otherwise as stated in the cellular center policy, the phone would send tokens to the base stations in the way to the other phone.

In this way he pays for the session on-line and in real time.

The center can profit since for a certain amount of money it will give a certain amount of tokens (and take its profit).

Base stations receive payment, and can later redeem the tokens from the cellular center back to money, or receive new tokens for their owner instead, for the owner's use in his/her communications over their cellular phone. Redeem of the tokens is a preferred embodiment, since in this method the center's profit is assured.

The billing policy can be written digitally by way of a digital document, with a date (and a short expiry date), signed by the cellular center. This policy would be stored in all base stations and phones, and they set the prices (by means of tokens) that the phones pay.

When two units interact, they can compare the time stamps or the version of the policy held by each unit. Thus the policy is updated as necessary and there would not be any dispute between the parties.

The information may be dispersed between units in the network. In each transaction, the parties thereto will check the date of each price list. The more updated price list will be transferred to the other party. Thus, the new price list or policy will gradually expand throughout the network.

The billing unit can be a "black box" inside each apparatus. This black box can be tamper-free, including means to destroy its contents or delete the information therein, if someone tries to tamper with it. This ensures that it can be trusted to work under commands given in policy documents.

Figure 2:
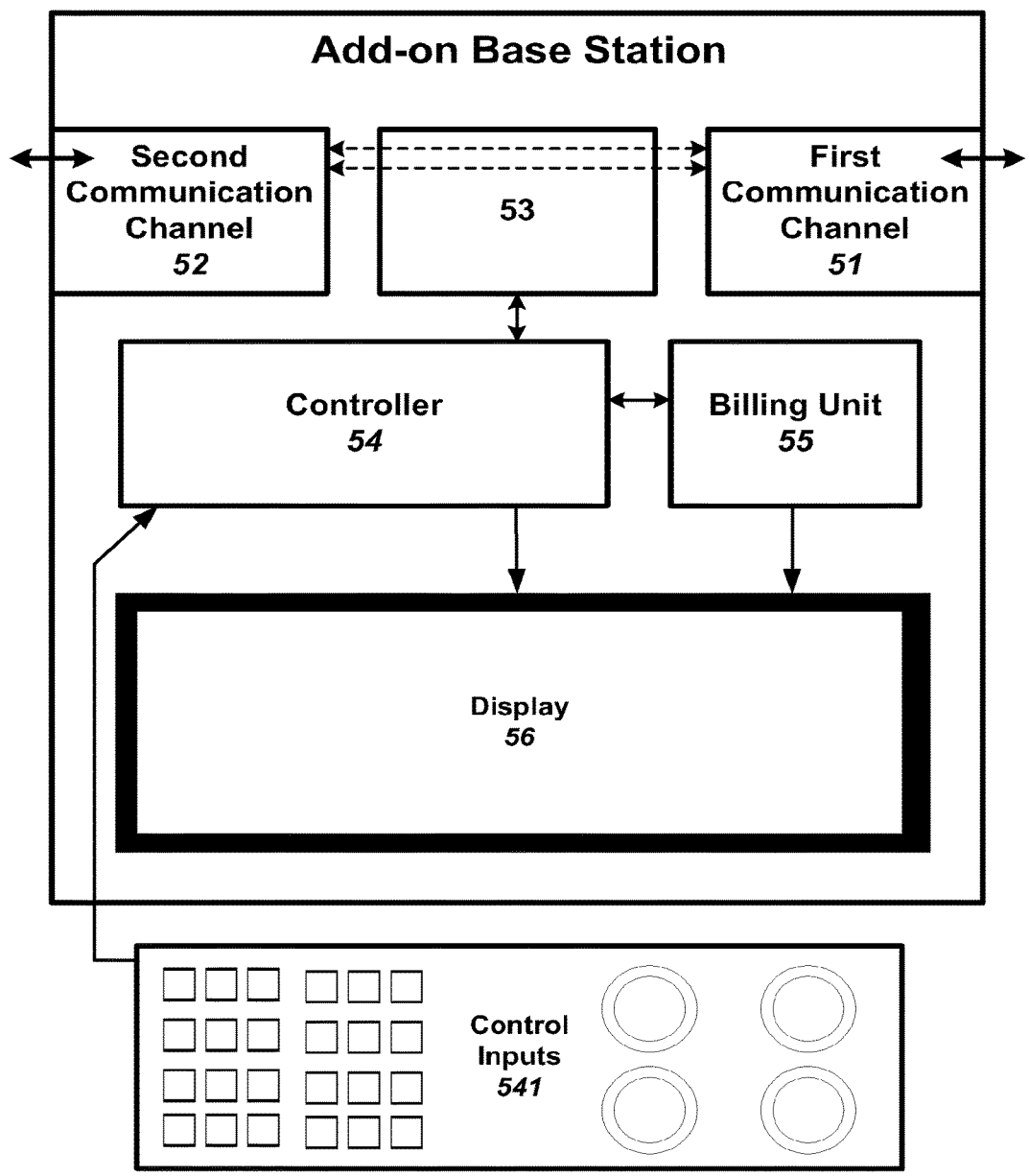
FIG. 2 details the functional structure of a novel base station.

The billing unit may be implemented as part of a call controller 54 in the base station, see FIG. 2.

In another embodiment, the black box function may be contained within a smart card.

The above structure and method may be either used to enhance an existing cellular system or to create a new cellular system altogether.

FIG. 2 details, by way of example, the functional structure of a novel base station (like base station 41, 42 or 43 of FIG. 1).

The basic function of the station is to connect a first channel 51 with a second channel 52. Either channel may be wired or wireless, using various technologies.

The channel electronic means 53 implements the actual communications to connect between the channels 51 and 52. A call controller 54 supervises and controls the operation of means 53, according to commands received from a user through the control inputs 541 for the base station.

A billing processor 55 computes the fee or payment the base station owner is entitled to, according to the amount of traffic on the channels 51, 52, and the method or policy as set in the billing document.

Thus, as more communication services are provided to the public, the owner of the base station will receive a larger fee accordingly.

A display 56 may be used to display the payment due or payment received for the calls placed by other users.

A novel feature of the base station is a unique property in each device. This unique property may be stored, for example, in either the call controller 54 or the billing processor 55.

This unique property allows to use the base station as an add-on device. In prior art, each phone had an unique identity, however the base stations had no unique properties. Each base station in prior art was distinguished based on its fixed location and wiring; there were no distinguishing means in the base station itself.

In the novel approach according to the present invention, however, there are base stations that are add-on units to be added to a network by various persons or firms. The location of each such unit is not known a priori; its very existence has to be announced to the network. A base station with an unique identity allows the network to keep track of the addition of each new base station. The unique identity helps manage the expanding network.

Various means may be used to achieve the unique identity of each add-on base station. For example, an unique number may be stored in memory means in units 54 or 55. Alternately, a digital document may be stored therein. A smart card with an unique number or document may be inserted in the base station to activate it.

A plurality of users may be served using wideband channels having the capability to serve several users at once. For example, channel 51 may be a wireless channel capable of communicating with several users using TDMA or FDMA or CDMA. Channel 52 may be an Internet connection capable of connecting to several destinations simultaneously.

Alternately, more than two channels may be used. This may allow a base station to concurrently communicate with more users and/or networks.

It is also possible to have other types of channels, for example wired phone lines.

Figure 3:
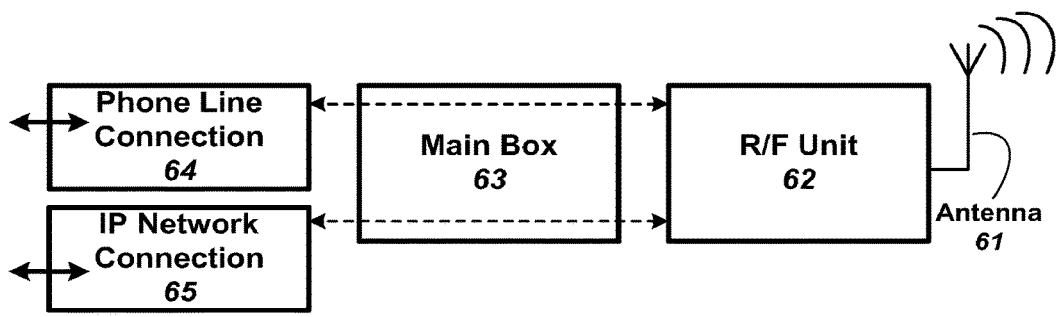
FIG. 3 details another embodiment of the base station.

FIG. 3 details another embodiment of the base station. The RF channel includes an antenna 61 and an RF unit 62.

The main box 63 includes the electronics for connecting the RF channel to the phone line connection 64 and the IP connection 65.

In a preferred embodiment, the phone line connection 64 is optional.

An add-on base station may only include the RF channel (to connect to a mobile user in a cellular wireless system) and the IP connection 65. The base station may also be connected to an optional source of electrical power.

The size of the base station can be no larger than a regular cellular phone. It has the following components: a) Main box, b) IP connection, c) antenna, d) phone line connection.

Some of the above components may be optional, as required for the desired function as an add-on to a cellular network.

Figure 4:
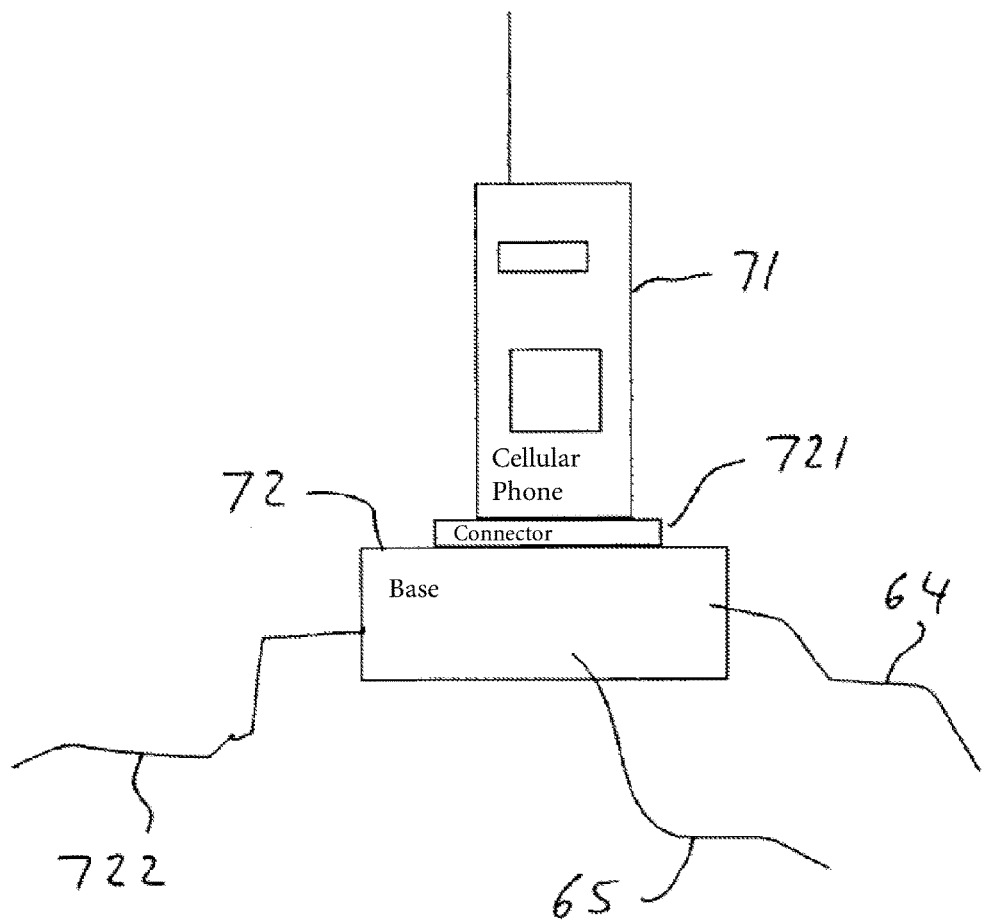
FIG. 4 illustrates the physical structure of a base station.

FIG. 4 illustrates an embodiment of the physical structure of a novel base station, including a cellular phone 71 and a base 72. A connector 721 is used to connect the two devices.

The owner may use the cellular phone as usual, to communicate as desired. When not in use, he/she may insert the phone 71 into the base 72 to form a base station: the phone 71 communicates with mobile users, and the base 72 is connected to wired networks through a phone line connection 64 and/or an IP connection 65. The device may further include mains power connection 722.

This system requires a modified phone, that has a capability to operate as a base station, both in transmit and receive modes. In cellular systems, the mobile phones transmit in a first frequency band and receive in a second frequency band, whereas the base station transmits in the second frequency band and receives in the first band.

Thus, a cellular phone cannot communicate directly with another phone. Accordingly, in the present invention, the phone 71 includes means for transmitting and receiving in the way used by base stations when it acts as a relay station.

Moreover, the phone 71 further includes means for transmitting and receiving control signals as required in a cellular network, to establish a communication link with a mobile phone and control that communication. The control signals may include, for example, power control, link establishment and disconnection. The control signals are specific to each cellular network like GSM, AMPS, CDMA etc.

The phone 71 may include means for performing one cellular link at a time, or it may include means for communicating at once with several mobile phones. In the latter case, it will function as a base station for several mobile phones located in its surroundings.

The above description refers to one embodiment, where the RF link is implemented with a modified cellular phone 71.

In another embodiment (see FIGS. 2 and 3), no cellular phone is used to implement the RF link with other phones. Rather, a complete base station includes all the RF transmit and receive means to allow it to communicate with a mobile cellular phone. The base station may include means to allow it to concurrently communicate with several mobile phones.

Furthermore, the base station may include means for charging a battery in the cellular phone. Thus, as the phone is inserted in the base, its battery is charged and concurrently the phone may be also used to expand a cellular network.

Figure 5:
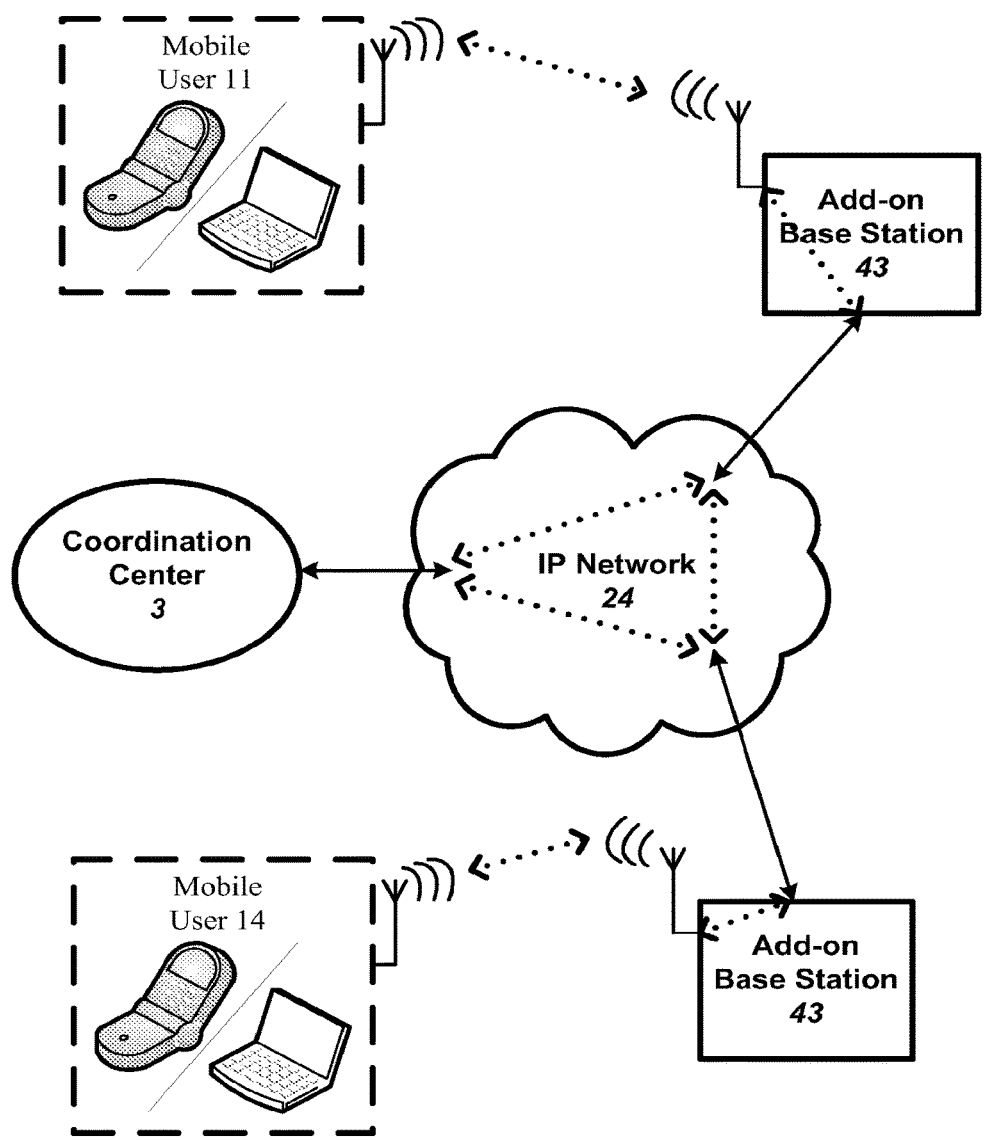
FIG. 5 details a cellular to cellular link.

FIG. 5 details a cellular to cellular link that may be implemented over the system as illustrated in FIG. 1.

A link may be established between a first (mobile) user 11 and a second (mobile) user 14. User 11 communicates with new base station 43, that is connected to an Internet network 24.

User 14, who is located in another area, communicates with new base station 44, that is also connected to an Internet network 24. Thus, a communication link is established between users 11 and 14 through the IP network 24. This is a low cost, fast link.

A Call Processing Method

Following is detailed a method for conducting a cellular to cellular call over the network.

The phone 11 which is initiating the call, is accessing the nearest base station 43 by means of radio communication.

It identifies and requests a (voice) connection to the other phone number 14. The number may be either en clair or encrypted. For an encrypted session—see details in the "Data Security" section.

B. The base station 43 then contacts the cellular center 3 (see FIG. 1), asking the IP address of the nearest station 44 to the destination phone number 14.

C. There are several possibilities:

C1. The cellular center 3 returns an answer, that the destination is not available.

In this case either the base station 43 is notifying the requesting phone 11 of the situation, or the center returns an alternate IP address.

The alternate IP address can be the destination voice mail, or a recorded message, for example: "The phone you have reached is not available right now, please try later."

It is also possible that the IP indicates a link to advanced services, such as "follow me" etc.

C2. The destination is available. In this case, it is possible that the return answer would come either directly from the base station 44 that is in contact with the phone 14, or be returned by the center 3.

In case an IP was returned, the base station 42 contacts the destination station over the network, and "calls" the phone 14.

If the phone 14 is taken off the hook, then packets of voice are exchanged between the base stations, and are forwarded from and to the phones 11 and 14, so that a phone session is established.

In case the phone 14 refused the call, the originator base station 43 can try to locate the phone again through the center, or ask to see if there is a voice mail IP from the center. The phone 14 refusing the call can also state another IP or number where it may be contacted, or a voice mail.

To preserve the privacy of the addressee, the phone 14 may ask the center not to disclose its refusal. Rather, the center may announce the caller that the addressee is not available.

Moving Between Cells (Base Stations)

Let us assume that a mobile phone has a link with a first base station. It may happen, during the conversation, that the phone detects that it receives the first base station at a low power, that is at a power lower than a predefined threshold.

In that case, a program in the phone may run a background search for an alternate base station. If it finds a second base station at a higher received power, then the phone will ask it to continue the call. It will send packets from the new station, and try to inform the old station of the change.

Alternately, the new base station can inform the old base station of the transfer of the call to it.

The other party's base station is informed by the phone or by the base station of the new IP address of new base station.

Thus the link is disconnected from the first base station and a new connection is established with the second base station, to improve the quality of the link. It is assumed that a higher received power indicates a link with an improved communication quality.

Locating Base Stations

After a base station was bought by a person or entity, a stage of activating the base station is to be performed. The device is activated when it is connected to and integrated within the cellular network.

The location of base station can be made known to the cellular center 3 using various methods. Several ways are detailed below by way of example. 1. During the registration of a base station, the person that registers the base station would state its location. 2. If the base station is connected to a phone line, its location can be found automatically from the number it is connected to. 3. The station can "listen" to transmissions from other base stations nearby (whose location is already known), and forward the information regarding the identity of received base stations and the power level of each such reception to the cellular center. Using this information, the cellular center can estimate the location of the new base station. 4. Nearby stations (which are already known in the system) can listen to a beacon or transmission from the new station and thus its location can be estimated. 5. A low-cost GPS device (with or without earth radio corrections) can be inserted into the base-stations, so that it would know and report its location.

Method for Locating the Destination Base IP

There are several methods to locate a phone.

1. This can be done in a similar fashion to what is done at present. Since the cellular center knows the location of base stations, it can start a search for the phone from the last place it was known to be.

2. Otherwise, the phone could be "paged" over paging channels, and the phone would reply to the nearest base station, and this reply would be forwarded by that base station to the cellular center.

3. A phone may be required to send a beacon once in a while to the nearest base station, so that the center may know its location.

4. The network may be divided into geographical zones. A city may be a zone, for example. The phone may be required to announce the center when it crosses the boundaries of zones.

Methods for achieving data security and for billing were detailed above.

Secure means as detailed in the "Data Security" section above may be used, to preserve the anonymity of the caller and the addressee. Only the cellular center will know the identity of the parties to a conversation. Even the center will not know whether the conversation actually took place.

Figure 6:
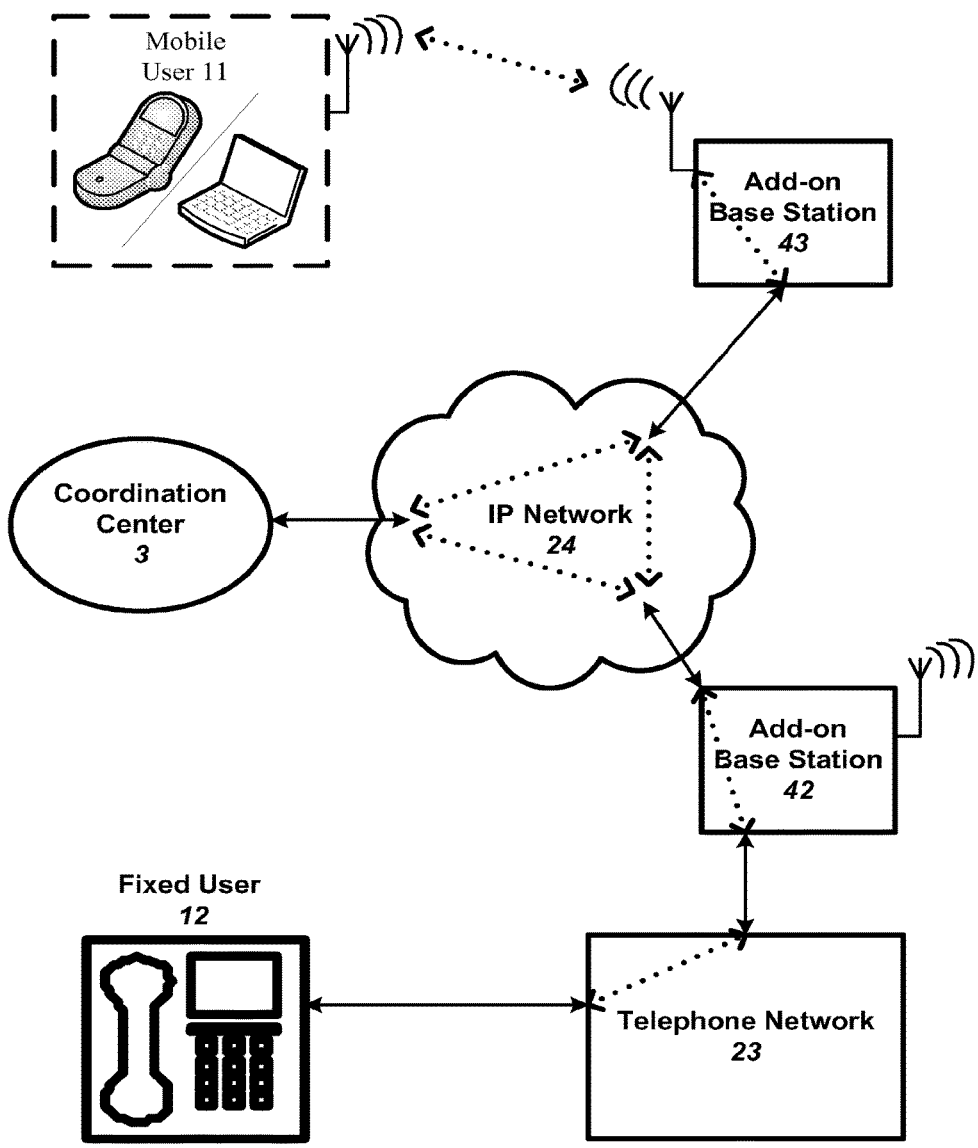
FIG. 6 details a cellular to regular phone link.

FIG. 6 details a cellular to regular phone link. A link is established between a first (mobile) user 11 and a second (fixed) user 12. User 11 communicates with new base station 43, that is connected to an Internet network 24.

User 12, who is located in another area, is connected to the existing telephone network 23.

A new base station 42 connects (bridges) between an Internet network 24 and the existing telephone network 23, wherein the point of entry to the telephone network 23 is preferably in a location close to that of user 12, so as to achieve a local, or low cost, phone link. Thus, base station 42 achieves a low cost connection between users 11 and 12.

A cellular center 3 (see FIG. 1) may direct user 11 to abase station that is close to the call destination (to user 12).

A Call Processing Method—Cellular to Regular Phone

Following is detailed a method for conducting a cellular phone to a regular phone call over the network.

The conversation goes the same as illustrated above for the cellular to cellular link with reference to FIG. 5, however the center 3 will not return the IP of the base station nearest the destination phone. Rather, the center 3 calculates the nearest base station 42 to the destination phone number 12 and give its IP.

That station 42 is the one that is connected to the phone system 23, and has agreed to process calls for the cellular system.

The originator base station 43 would connect to the base station 42, which would act as a gateway station.

The line module in the gateway station 42 will play the role of a cellular phone. The phone conversation can be encrypted up to the gateway station.

A Call Processing Method—Regular Phone to Cellular

Several methods may be used to implement such a call.

1. If there is cooperation with a telephone company, the cellular center 3 can inform it of the phone numbers of all the base stations 42 that have agreed to be a gateway station.

The regular phone user can dial a number with a special prefix, and the call would be routed to the nearest gateway station 42 whose line is available.

The gateway station can know of the destination by means of caller ID, DTMF, other digital way, or that the caller would get another tone signal from the gateway station, and could dial the rest of the number by DTMF identification.

2. Otherwise, it is believed that the telephone company will show at least a measure of cooperation, to the effect that it will contact the caller to the nearest gateway station number. Then, the dialing can be completed with the gateway station identifying the DTMF from the caller.

Since we assume many people will use the new cellular system, it is a reasonable assumption that there will be a gateway station available in the same telephone switchboard of the destination phone, so the call would be local.

3. If there is no cooperation from the telephone company, a 1-800 number can be set up, so that someone could find the nearest gateway station near him.

In other words, the caller would have to call directly to some gateway station, and continue dialing from there, by DTMF for example. The gateway may provide a dial tone to assist this dialing. The gateway may use automatic DTMF recognition for that purpose.

The gateway base station in this case is playing the caller phone to the network. It may also add information such as caller ID.

Billing in this case is by the receiver phone, or otherwise as set by policy of the cellular center. It is possible that the caller would pay for the tokens, if the phone company bills him for their cost, and sends that amount to the cellular center. This enables the base stations to bill the cellular center later, if it is by prior agreement.

Figure 7:
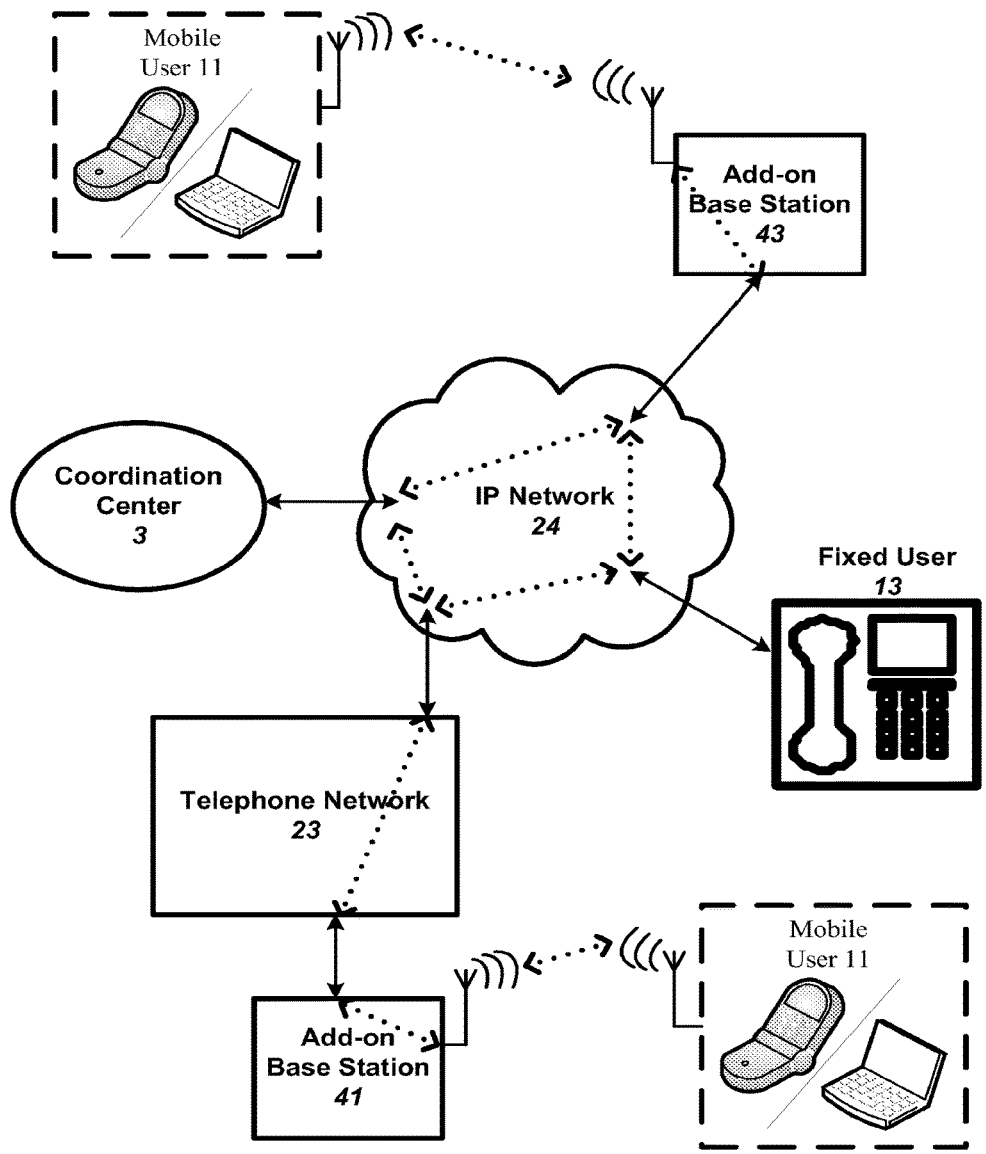
FIG. 7 details a link to an IP phone.

FIG. 7 details a link to an IP phone. A first (mobile) user 11 may connect to a second (fixed IP phone) user 13.

User 11 may connect either through base station 41 or base station 43. The new base station 43 is directly connected to an Internet network 24. The new base station 41 connects (bridges) between the cellular user 11 and the existing telephone network 23, which is connected to Internet 24.

A Call Processing Method—from an IP Phone

Since calls are already over the IP network, people may prefer to use the IP network as their main phone network.

Special apparatus could be made to play the part of base station and phones, all in a regular phones case.

Otherwise, this may be done with PCs with software and with or without hardware (possibly a smart card—to do all the black box part).

Communication to/from an IP phone is the same as regular cellular phones, if implemented in this way, and can also be as outside phones which contact a base station that agreed to act as an IP gateway.

Remarks

Various embodiments of the present invention are possible. Following are several examples.

1. It is possible to create centers of access to the system, which may contain an array of base stations that will function as gateway stations. It is also possible to build antenna towers in areas far from urban areas such as roads.

2. It is possible to include relay option means in cellular phones, in such way that if a phone is far from a cell, but there is another phone in the way that receives both, it can act as a relay.

This structure is better suited for car phones. It can be also used in handheld phones.

Tokens can be also paid to the relay station that takes part in a communication link.

3. Large systems can be subdivided into smaller systems or by location or by country or another geographical criterion. Connection between those systems can also be done by IP means, if desired.

4. The add-on base stations may be installed in various vehicles. This may achieve cellular coverage in areas that may otherwise not be covered. The device may include means to install in a vehicle, including use of an installed antenna and the power source in the car.

Thus, parked cars may be used as relay stations, with a cellular phone installed in the car acting as an add-on base station.

5. The mobile base stations may include wireless means to connect to each other. A linked channel may thus be achieved, with the base stations acting as relay stations. This may allow communications where the fixed base stations are far apart from each other. This structure allows for a link between moving cars.

6. The add-on base stations may allow surfing an Internet. To achieve this, the base may include communication means for data, voice and/or multimedia. Any type of information may be transferred.

7. The system may be used for encrypted E-mail. An advantage of the present system is that the identity of the parties to that E-mail correspondence are kept secret from the base stations and other factors in the net. Only the center knows the identity of the parties to the E-mail.

The technology may also be used in E-commerce. It preserves the privacy of the parties to a transaction.

8. The system may use a cellular center to coordinate the connections between users. Alternately, a distributed center network may be used.

Advantages

1. Lower Radiation Base Stations

Since cellular cells (each base station) may be quite close to each other, the cellular cells can be small, and reduce the transmission power needed for the base stations, resulting in lower radiation.

2. Lower Radiation Mobile Phones

Since base station are closer, the distance from a mobile phone to a base station is shorter. Thus, the mobile phone may transmit at a lower power.

3. Low Cost Deployment

There is no need for a new infrastructure. That is achieved with low cost base stations, that can be mass produced.

Since people may put these low radiation stations in their homes or offices, there may be no need for licenses from authorities to install these devices. There may be no need to ask for a license to install a high power transmitter or a large antenna.

Since routing may be done for example by IP routing, there is no need for large switchboards. Actually there may be no need for ANY switchboard. Only computers that connect to the network are required, to act as the cellular centers.

There is no need for highly trained personnel to deploy the network.

4. Quick, no Hassle Deployment

Since the system is using existing infrastructure, there is only need to put and connect base stations, which ordinary people can do themselves, just like connecting a wireless phone, the deployment is rapid, without the need to construct and install large antennas.

5. Lower Cost of Operation

There is no need to take care of a large infrastructure and its overhead, like switchboards, carrier lines, etc.

There is no need for personnel or highly trained personnel to manage the network. Since the equipment is so cheap, it can be just replaced.

6. Cheap Air-Fare

Since the overall cost is low, the prices for the end user can be low, and the possibility to earn money from base stations, may be an incentive. Also, as described, connections to/from regular phone system may be done as local calls. Therefore, there is additional savings in payment to phone companies.

It will be recognized that the foregoing is but one example of an apparatus and method within the scope of the present invention and that various modifications will occur to those skilled in the art upon reading the disclosure set forth hereinbefore.

What is claimed is:

1. An add-on base station adapted for deployment by an end user through connecting the add-on base station to the public Internet, the add-on base station comprising:
   a transceiver adapted to establish wireless radio-frequency links with mobile devices;
   a first interface, separate from said transceiver, that is adapted for connecting, by an end user, to a pre-existing physical connection point to the public Internet network and for communication over the public Internet;
   a built-in global positioning system (GPS) device;
   wherein the add-on base station is adapted to:
      determine current geographical location data for the add-on base station using the built-in GPS device;
      transmit, to a server of a server system via the public Internet, the current geographical location data determined using the built-in GPS device in response to connecting the add-on base station to the public Internet, and the server system is adapted to identify the base station based on a unique property stored in a tamper-free unit of the add-on base station and to track the add-on base station based on the identification;
      obtain, from a server of the server system accessed via the public Internet, a gateway Internet Protocol (IP) address for a remote gateway, wherein the remote gateway includes a first interface to the public Internet and a second interface communicably coupled to a network of a telephone service provider; and
      route, using the gateway IP address, data from received from a mobile device through the transceiver, over the public Internet, to the remote gateway.

2. The add-on base station of claim 1, wherein at least one server of the server system provides authorization for the add-on base station to route data to the remote gateway through the public Internet in response to receiving the current geographical location data.

3. The add-on base station of claim 2, wherein the at least one server of the server system that provides authorization for the add-on base station to route data to the remote gateway does not take part in establishing a link over which data is routed from the mobile device to the remote gateway.

4. The add-on base station of claim 1, wherein at least one server of the server system is adapted to determine whether the add-on base station is operating properly and to authorize and de-authorize the add-on base station based on the determination of whether the add-on base station is operating properly.

5. The add-on base station of claim 1, wherein the add-on base station is owned and installed by an individual or entity, separate and distinct from the telephone service provider, with access to the public Internet.

6. The add-on base station of claim 1, wherein the add-on base station expands coverage of a cellular network and is owned and installed by an individual or entity, separate and distinct from the telephone service provider, with access to the public Internet.

7. The add-on base station of claim 1, wherein mobile devices authorized to route data using the add-on base station are authorized based on an authorization process beyond an authorization process used by the telephone service provider in providing access to cellular services through cellular base stations installed by the telephone service provider.

8. The add-on base station of claim 1, wherein the server system is adapted to track the geographical location of the add-on base station based on the identification.

9. The add-on base station of claim 1, wherein the server system is adapted to authorize and de-authorize add-on base stations to route data to the remote gateway through the public Internet by recurrently issuing an operating license for the add-on base station.

10. The add-on base station of claim 1, wherein the add-on base station is adapted to transmit recurrent updates regarding current operating parameters to a server of a server system via the public Internet, and the current operating parameters include current geographical location data.

11. The add-on base station of claim 10, wherein the server system is adapted to authorize and de-authorize the add-on base station to route data to the remote gateway through the public Internet based on the recurrent updates.

12. The add-on base station of claim 1, wherein the add-on base station has transmission power lower than transmission power of conventional base stations and produces a cell smaller than macrocells of conventional base stations.

13. An add-on base station adapted for deployment by an end user through connecting the add-on base station to the public Internet, the add-on base station comprising:
   a transceiver adapted to establish wireless radio-frequency links with mobile devices;
   a first interface, separate from said transceiver, that is adapted for connecting, by an end user, to a pre-existing physical connection point to the public Internet network and for communication over the public Internet;
   wherein the add-on base station is adapted to:
      detect an identity and power level of a received transmission from one or more other base stations;
      transmit data identifying the identity and power level of the received transmission from the one or more other base stations to a server of a server system via the public Internet, and the server system is adapted to identify the base station based on a unique property stored in a tamper-free unit of the add-on base station and to track the add-on base station based on the identification;

obtain, from a server of the server system accessed via the public Internet, a gateway Internet Protocol (IP) address for a remote gateway, wherein the remote gateway includes a first interface to the public Internet and a second interface communicably coupled to a network of a telephone service provider; and route, using the gateway IP address, data from received from a mobile device through the transceiver, over the public Internet, to the remote gateway.

14. The add-on base station of claim 13, wherein at least one server of the server system provides authorization for the add-on base station to route data to the remote gateway through the public Internet in response to receiving the current geographical location data.

15. The add-on base station of claim 14, wherein the at least one server of the server system that provides authorization for the add-on base station to route data to the remote gateway does not take part in establishing a link over which data is routed from the mobile device to the remote gateway.

16. The add-on base station of claim 13, wherein at least one server of the server system is adapted to determine whether the add-on base station is operating properly and to authorize and de-authorize the add-on base station based on the determination of whether the add-on base station is operating properly.

17. The add-on base station of claim 13, wherein the add-on base station is owned and installed by an individual or entity, separate and distinct from the telephone service provider, with access to the public Internet.

18. The add-on base station of claim 13, wherein the add-on base station expands coverage of a cellular network and is owned and installed by an individual or entity, separate and distinct from the telephone service provider, with access to the public Internet.

19. The add-on base station of claim 13, wherein mobile devices authorized to route data using the add-on base station are authorized based on an authorization process beyond an authorization process used by the telephone service provider in providing access to cellular services through cellular base stations installed by the telephone service provider.

20. The add-on base station of claim 13, wherein the server system is adapted to track the geographical location of the add-on base station based on the identification.

21. The add-on base station of claim 13, wherein the server system is adapted to authorize and de-authorize add-on base stations to route data to the remote gateway through the public Internet by recurrently issuing an operating license for the add-on base station.

22. The add-on base station of claim 13, wherein the add-on base station is adapted to transmit recurrent updates regarding current operating parameters to a server of a server system via the public Internet, and the current operating parameters include current geographical location data.

23. The add-on base station of claim 22, wherein the server system is adapted to authorize and de-authorize the add-on base station to route data to the remote gateway through the public Internet based on the recurrent updates.

24. The add-on base station of claim 13, wherein the add-on base station has transmission power lower than transmission power of conventional base stations and produces a cell smaller than macrocells of conventional base stations.

25. An add-on base station adapted for deployment by an end user through connecting the add-on base station to a pre-existing connection point to the public Internet, the add-on base station comprising:

a built-in global positioning system (GPS) device adapted to determine current geographical location data for the add-on base station;

wherein the add-on base station is adapted to:

transmit, to a server of a server system via the public Internet via a network interface, the current geographical location data determined using the built-in GPS device in response to connecting the network interface of the add-on base station to the public Internet, wherein the server system is adapted to identify the base station based on a unique property stored in a tamper-free unit of the add-on base station and to track the add-on base station based on the identification and wherein the network interface is adapted for connecting, by an end user, to a pre-existing physical connection point to the public Internet network and for communication over the public Internet;

obtain, from a server of the server system accessed via the public Internet, a gateway Internet Protocol (IP) address for a remote gateway, wherein the remote gateway includes a first interface to the public Internet and a second interface communicably coupled to a network of a telephone service provider; and route, using the gateway IP address, data from received over a wireless communication link with a cellular phone, with the wireless communication link established through a wireless interface of the add-on base station separate from the network interface, wherein the data is routed through the network interface, over the public Internet, to the remote gateway.

* * * * *